United States Patent
Dahmani et al.

(10) Patent No.: US 6,256,122 B1
(45) Date of Patent: Jul. 3, 2001

(54) DEVICE FOR THE ELIMINATION OF THE ZERO ORDER BEAM EMERGING FROM A HOLOGRAM ILLUMINATED IN POLARIZED LIGHT

(75) Inventors: Brahim Dahmani, Montrouge (FR); Yuri Korzinin; Vitaly I. Sukhanov, both of St. Petersbourg (RU)

(73) Assignee: Corning Precision Lens, Cincinnati, OH (US)

( * ) Notice: Subject to any disclaimer, the term of this patent is extended or adjusted under 35 U.S.C. 154(b) by 0 days.

(21) Appl. No.: 09/284,045

(22) PCT Filed: Oct. 3, 1997

(86) PCT No.: PCT/US97/18036

§ 371 Date: Jul. 20, 1999

§ 102(e) Date: Jul. 20, 1999

(87) PCT Pub. No.: WO98/15854

PCT Pub. Date: Apr. 16, 1998

(30) Foreign Application Priority Data

Oct. 8, 1996 (FR) .................................................. 96 12248
Oct. 8, 1996 (RU) .................................................. 96120355

(51) Int. Cl.⁷ ................................ G02B 5/32; G02B 5/30
(52) U.S. Cl. ................................ 359/20; 359/15; 359/19; 359/493; 359/494; 359/501; 349/5
(58) Field of Search ................................ 359/15, 19, 20, 359/483, 485, 493, 494, 501, 562; 349/5, 80, 96

(56) References Cited

U.S. PATENT DOCUMENTS

| 3,682,526 | * | 8/1972 | Matsumoto . |
| 4,407,566 | | 10/1983 | Rosenberg . |
| 4,807,978 | * | 2/1989 | Grinberg et al. . |

(List continued on next page.)

FOREIGN PATENT DOCUMENTS

| 0 349 884 | | 1/1990 | (EP) . |
| 0 715 190 | | 6/1996 | (EP) . |
| 62293223 | * | 12/1987 | (JP) . |
| 2296213 | * | 12/1990 | (JP) . |
| 5249318 | * | 9/1993 | (JP) . |
| 0583150A1 | * | 2/1994 | (WO) . |
| WO96/12373 | | 4/1996 | (WO) . |

OTHER PUBLICATIONS

Ichikawa, N., "Holographic optical element for liquid crystal projectors", Proceedings of the 15$^{th}$ International Display Research Conference (Asia Display '96), Hamamatsu, Japan, Oct. 16–17, 1995, Reference S32–1, pp. 727–729.

Loiseaux et al., "Compact spatio–chomatic single LCD Projection Architecture", Proceedings of the 15$^{th}$ International Display Research Conference (Asia Display '95), Hamamatsu,m Japan, Oct. 16–17, 1995, Reference S7–4, pp. 87–88.

Primary Examiner—Cassandra Spyrou
Assistant Examiner—John Juba, Jr.
(74) Attorney, Agent, or Firm—Maurice M. Klee

(57) ABSTRACT

Device for elimination of the zero order beam emerging from holograms illuminated in polarized light includes a birefringent plate (5) illuminated by both said zero order beam (3) and by a diffracted beam (4) emerging from the hologram (2). The plate is arranged and sized such that one of the beams (3, 4) emerges from the plate with its plane of polarization not appreciably rotated and such that the other of said beams emerges with its plane of polarization rotated by 90°. The device further includes a polarizer (9) illuminated by the beams (3', 4') emergent from the birefringent plate (5), the polarizer having its plane of maximum transmittance parallel to the plane of polarization of the diffracted beam emerging from the birefringent plate as beam (4'). The device finds industrial applicability in the optical systems of video image projectors employing active matrix liquid crystal cells.

13 Claims, 1 Drawing Sheet

U.S. PATENT DOCUMENTS

| | | | |
|---|---|---|---|
| 4,810,047 | * | 3/1989 | Pernick ................................... 359/20 |
| 4,882,619 | * | 11/1989 | Hasegawa et al. . |
| 5,526,145 | * | 6/1996 | Weber .................................... 359/15 |
| 5,737,040 | * | 4/1998 | Ichikawa et al. ....................... 359/15 |
| 5,959,704 | * | 9/1999 | Susuki, et al. ........................... 349/5 |
| 6,008,914 | * | 12/1999 | Sasagawa et al. ..................... 359/15 |

* cited by examiner

DEVICE FOR THE ELIMINATION OF THE ZERO ORDER BEAM EMERGING FROM A HOLOGRAM ILLUMINATED IN POLARIZED LIGHT

BACKGROUND OF THE INVENTION

The present invention relates to a device for the elimination of the zero order beam emerging from a hologram illuminated in polarized light and more particularly to a video image projector equipped with such a device.

The functions of numerous conventional optical components, lenses, filters, etc., can today be produced by means of holograms which have various advantages, particularly those of having a planar shape which does not require much space and of being inexpensive to manufacture.

However, the functioning of a hologram, as that of any optics calling for diffraction of light, is a function of the wavelength of this light. When an incident beam of white light illuminates a hologram, this dependency is at the origin of the passage of the latter by a beam called "zero order" beam which is not diffracted and therefore not deflected, in contrast to the beam diffracted by the hologram. The presence of these two beams coming out of the hologram can have the effect of contaminating the beam of diffracted light with the white light of the nondiffracted beam. This is the case in particular when the hologram produces three beams of red, green ad blue light respectively, for example, for the projection of video images in color, the zero order beam, composed of white light, affects the purity of the colors.

In order to avoid this disadvantage, it is possible to manufacture the hologram in such a way that the usable diffracted beams diverge angularly to a greater extent from the axis of the zero order beam, or to use the diffracted beams a long distance from the hologram, where these beams are sufficiently separated spatially so that the objects which they illuminate cannot also receive the light of the zero order beam.

This solution unfortunately leads to very bulky assemblies, which are obviously not suitable in apparatuses such as, for example, the video image or television projectors intended for the general public, of which the space requirement must be as small as possible.

The present invention therefore aims to produce a device for elimination of the zero order beam emerging from a hologram illuminated in white light, which is both effective and has a small space requirement.

SUMMARY OF THE INVENTION

The present invention also aims to produce a video image projector equipped with such a device.

These aims of the invention are reached, as are others which will appear upon reading of the following description, with a device for elimination of the zero order beam emerging from a hologram illuminated in polarized light, this device being remarkable in that it includes a) a plate made of a birefringent material illuminated by said beam and the diffracted beam which emerges from the hologram, this plate being arranged and sized in such a way that one of the beams emerges from the plate without its plane of polarization having undergone appreciable rotation, while the plane of polarization of the other has undergone a rotation, of 90°, and b) a polarizer illuminated by the two beams which emerge from the birefringent plate, the plane of maximum transmittance of this polarizer being parallel to the plane of polarization of the beam which emerges from the birefringent plate from the beam diffracted by the hologram.

This plane of maximum transmittance is perpendicular to the plane of polarization of the other beam of zero order, which emerges from the birefringent plate, so that the zero order beam is extinguished by the polarizer.

Since the hologram the birefringent plate, and the polarizer can be very close to one another or even attached, one sees that the elimination of the zero order beam occurs in a very small volume.

The invention thus makes it possible to produce a video image projector with a small space requirement, the images being formed in an active matrix of liquid crystal cells each passed through by a polarized light beam emerging from a hologram. The projector is remarkable in that it includes a device, according to the invention, for elimination of the zero order beam emerging from said hologram.

DETAILED DESCRIPTION OF THE DRAWINGS

DETAILED DESCRIPTION OF THE INVENTION

Figure 1:
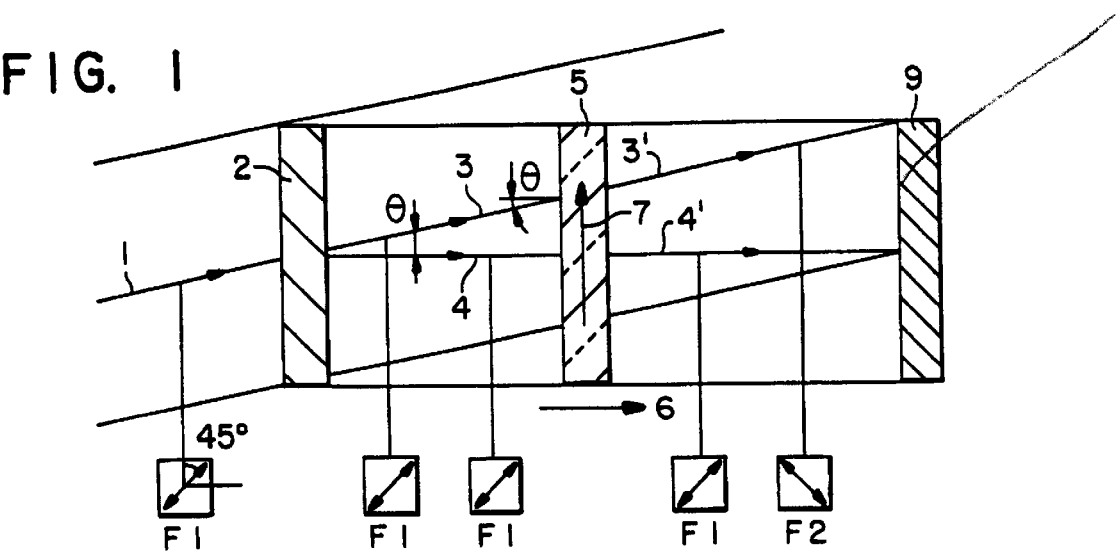
FIG. 1 is a diagram of the device according to the invention.

Reference is made to FIG. 1 of the appended drawing in which the device according to the invention has been represented diagrammatically in axial section. This invention includes a source (not represented) of a beam with axis 1 (or beam 1) of light with planar polarization, incident on hologram 2 from which emerges a beam with axis 3 (or beam 3) of zero order, not deflected by the hologram, and a beam with axis 4 (or beam 4), which is diffracted and therefore deflected.

The device also includes plate 5 made of a birefringent material, arranged in such a way as to intercept the two beams 3 and 4, which, coming out of hologram 2, have the same planar polarization with orientation marked by the double arrow $F_1$, at 45° with respect to the plane of FIG. 1.

Advantageously, according to the invention, the hologram is designed and produced so that usable diffracted beam 4, which carries out some optical treatment of incident beam 1, emerges perpendicular to the hologram and illuminates plate 5 at normal incidence. As will be seen further on, this characteristic makes it possible to give the device, according to the invention, maximum compactness.

Birefringent plate 5 which is used is uniaxial, with high-speed axis 6 normal to its two end surfaces, or with high-speed axis 7 parallel to these surfaces. In the case of a plate with axis 6 parallel to beam 4 diffracted by the hologram, one sees that the plate does not influence the orientation of the plane of polarization of the light of this beam, which thus emerges from plate 5 (beam 4') with a polarization of unchanged orientation, as diagrammed by the double arrow $F_2$ marking this orientation.

In contrast, the angle of incidence of the zero order beam 3' on plate 5 is equal to the angle θ of diffraction, which separates the two beams emerging from hologram 2. The beam is propagated then in the thickness of the plate making an angle β such that, according to the second law of Descartes:

$$\beta = \arcsin\left(\frac{\sin\theta}{n_0}\right)$$

$n_0$ being the ordinary index of plate 5.

It is known that while plate 5 introduces, between the two components TE and TM of beam 3, a phase shift $\theta_{TE}-\theta_{TM}$ such that:

$$\theta_{TE}-\theta_{TM}=[2\pi d/\lambda\cos\beta]\cdot[n_0-(n_0^2\cos^2\beta+n_e^2\sin^2\beta)^{1/2}]$$

λ being the wavelength of the light, $n_e$ and d the extraordinary refractive index and the thickness, respectively, of plate 5.

If one assumes now that the planar polarization of beam 3 is such that the electric vector of the radiation is inclined 45° with respect to the plane of incidence of the beam, as diagrammed in FIG. 1, the components TE and TM of the zero order beam 3 have equal intensities, and the plane of polarization of beam 3 rotates 90° in its passage through plate 5 if:

$$\theta_{TE}-\theta_{TM}=\pi$$

that is to say, introducing this condition in equation (2) above, if:

$$2d[n_0(n_0^2\cos^2\beta+n_e^2\sin^2\beta)^{1/2}]=\lambda\cos\beta$$

By choosing the thickness d of the plate and the angle θ of diffraction of the hologram in such a way that equation (3) is satisfied, the planes of polarization of the two beams 31 and 4' which emerge from plate 5 are oriented at an angle of 90° with respect to one another.

According to the invention, these beams are intercepted by a conventional polarizer 9 oriented in such a way that its plane of maximum transmittance is oriented parallel to the direction of double arrow $F_1$, so that this polarizer transmits diffracted beam 4'. The polarizer simultaneously absorbs the zero order beam 3 whose plane of polarization, marked by arrow $F_2$, is oriented at 90° with respect to that of the diffracted beam. The light which emerges from the polarizer is then completely rid of the zero order beam.

It should be noted that thanks to their parallel nature, obtained by the orientation, according to the invention, of diffracted beam 4 perpendicularly to the plane of the hologram and to that of plate 5, hologram 2, plate 5, and polarizer 9 can be attached to one of the other two elements, or all together, which gives the device a very small space requirement, in accordance with one of the aims set forth for the present invention.

If the axis of plate 5 is oriented according to arrow 7, parallel to the end surfaces of the plate and at 45°, with respect to the plane of polarization of the incident light hitting this plate, the same difference of 90° is established between the planes of polarization of beams 3' and 4' which emerge from this plate, by choosing d and θ so that the following equation is satisfied:

$$2(n_e-n_o)d=\lambda\cos\beta/(1-\cos\beta)$$

with β verifying the equation (1) above.

The transmitted zero order beam 3' is absorbed as explained in the preceding section.

A device according to the characteristics disclosed above was produced. Measurements showed that the device makes it possible to reduce, by at least 400 times, the intensity of the zero order beam, whose influence on the usable light beam then becomes negligible.

Plate 5 of the device according to the invention can be produced using various birefringent materials which are well known in the technique. It can, for example, be a plate called a "half-wave" plate produced out of a uniaxial crystal, or a plate of mica, suitably cut. It is also possible to use a birefringent polymer film such as a drawn polyvinyl alcohol film, a liquid crystal cell, or else a plate made of an optically active material as described in the work entitled "Optical waves in crystal", authors: A. Yariv, P. Yech, New York, Wiley International Publications, 1984. It is also possible to use, according to the invention, a plate made of a birefringent porous glass, such as one of those described in the work entitled "Phase separation in glass" prepared by O. V. Mazurin and E. A. Porai-Koshits, published in 1984 by North-Holland (Amsterdam, Oxford, New York, Tokyo).

The plates produced by cutting a birefringent crystal such as mica are expensive from the standpoint of the price of the crystal itself as well as the cost of cutting it, which must be precise. In order to reduce the cost of plate 5, it is possible to use birefringent polymer films, but they have the disadvantage of a high level of diffusion of the light and mechanical and physical properties which are subject to deterioration.

This is why, according to the invention, one will preferably use porous glass in order to form plate 5. Porous glass has the stability of glass and substantial birefringence (see the aforementioned work of Mazurin et al., and a work edited under the directorship of B. G. Varshal entitled "Biphasic glasses: structure, properties, applications", published by Academie des Sciences de l'URSS [Academy of Sciences of the USSR], Leningrad, 1991. Experiments have shown that it is possible to produce a porous glass with low dispersion and a birefringence characterized by a value $|n_o-n_e|$ of approximately $1.3 \cdot 10^{-3}$ [sic: $1.3\times10^{-3}$]. It is then possible to produce plate 5, with a thickness of approximately 1 mm, out of such a porous glass with no great restriction on the precision of machining the surfaces of the plate, which further reduces the price of such a plate, which is produced out of an inexpensive material.

As an illustrative and non-limiting example of the present invention, its application to the projection of video images or of television will now be described in connection with FIGS. 2 and 3 of the appended drawing. One finds again in these figures hologram 2 (or 2', or 2"), birefringent plate 5, and polarizer 9 of the device according to the invention.

Figure 2:
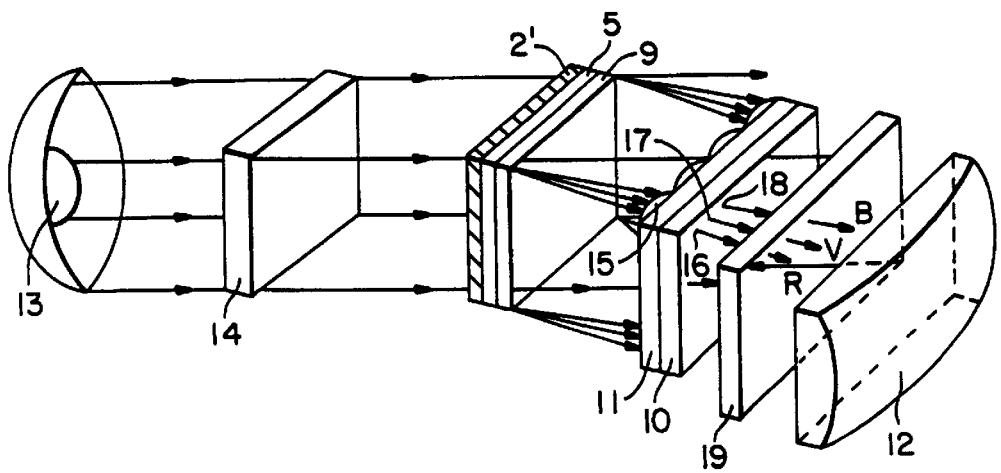
FIG. 2 is a diagram of the optical system of a video image projector equipped with the device according to the invention.

FIG. 2 diagrammatically represents the optical system of a projector of video images displayed on a panel consisting of rectangular matrix 10 of liquid crystal cells which are controlled electrically (not represented), the different cells of the matrix being delimited by opaque mask 11 (called "black matrix") attached to it. It is therefore a matter of projecting a real image of the real image displayed by matrix 10 on a projection screen (not represented) using a projection objective 12 which picks up the displayed image again. For this purpose, one projects, in a known manner, polarized light through each liquid crystal cell of matrix 10, these cells acting selectively as light shutters. The light comes from source 13 of white light, which passes through analyzer 14 which gives it a planar polarization. Advantageously, this analyzer can be replaced by a light converter as described in the French patent application filed today by the applicant, entitled "Converter of natural white light into light with planar polarization", this converter preventing any loss of luminous energy coming from source 13.

The light thus polarized is received by hologram 2'. According to an arrangement known through the publication entitled "Compact spatio-chromatic single LCD Projection Architecture" by B. H. Loiseaux et al., published under the reference 57-4 on pages 87 and 88 of the transactions of the Conference Asia Display *95 which was held in Hiroshima, Japan, this hologram produces a number of triplets of beams respectively of red R, green V, and blue B light, the beams of each triplet being focused by a microlens of grid 15 of such microlenses on three adjacent cells 16, 17, 18 of matrix 10, which define one of the pixels of the image to be projected. Of course, as appears in the diagram of FIG. 1, the beams emitted by hologram 2 pass through birefringent plate 5 and polarizer 9 which are suitably oriented in order to absorb, according to the invention, the zero order beam which has passed through the hologram, so that this beam does not illuminate grid 15 of micro-lenses which focus these beams.

The electronic control of the cells of the matrix selectively unblocks the passage of the light through polarizer 19 arranged in front of objective 12, this polarizer being oriented in such a way as to block normally the passage of this light, according to a conventional mode of functioning of a matrix with liquid crystal cells.

It should be noted that plate 2', plate 5 and polarizer 9 are attached to one another in a particularly compact manner.

Figure 3:
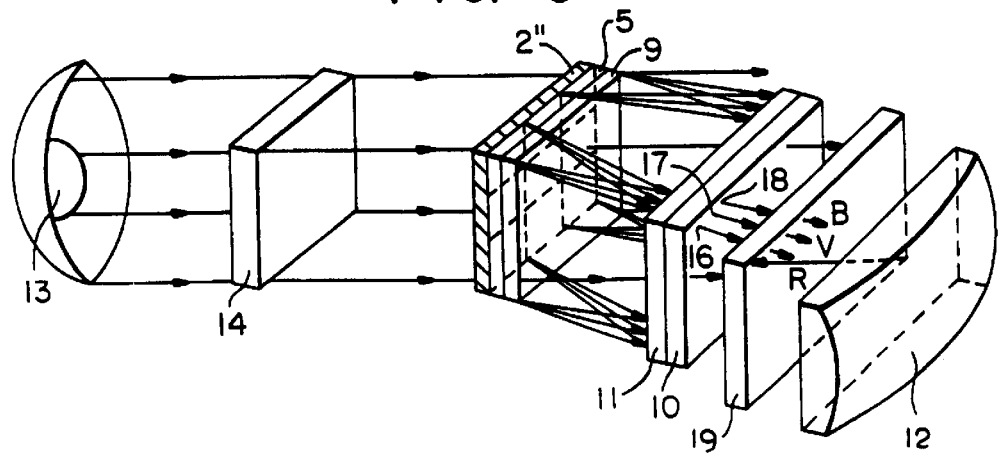
FIG. 3 is a diagram of a variant of the optical system represented in FIG. 2.

Reference is now made to FIG. 3 of the appended drawing, representing another embodiment of the optical system of a video image projector which incorporates the device according to the invention. In this figure, numerical references identical to references used in FIG. 2 mark identical or similar elements. Thus, one finds again in the optical system of FIG. 3, elements 5, 9, 10, 11, 12, 13, 14, 16, 17, 18 and 19 defined above. In fact, the optical system of FIG. 3 is distinguished from that of FIG. 2 by the contents of hologram 2" which is attached to birefringent plate 5 and by the absence of the grid of micro-lenses 15 of the system of FIG. 2.

In the publication entitled "Holographic optical element for liquid crystal projectors" by N. Ichikawa, referenced S32-1 in the transactions of the Conference Asia Display 95 mentioned in the preceding, the structure and functioning of a hologram suitable for making up hologram 2" is described. Also described there is a process for manufacturing this hologram. It is made up of a number of grids, each associated with one of the triplets of red, green and blue cells making up a pixel of liquid crystal matrix 10. Each grid diffracts the incident light in such a way as to form three beams, red, green and blue respectively, which are focused each on the corresponding cell 16, 17, 18 of the triplet. Grid 15 of micro-lenses of the device of FIG. 2 then becomes unnecessary.

It should be noted that components 2", 5, 9, 11, and 10 which are all planar can be attached to one another, which gives the optical system very great compactness, in accordance with one of the essential objectives sought by the present invention.

Of course, the invention is not limited to the embodiments described and represented which were only given as examples.

What is claimed is:

1. Apparatus comprising in order:
   (a) a hologram which forms a zero order beam and a diffracted beam when illuminated by polarized light, said diffracted beam being substantially perpendicular to the surface of the hologram;
   (b) a plate comprising a birefringent material for receiving said zero order beam and said diffracted beam, said plate causing the plane of polarization of one of the beams to undergo a rotation of 90° while the plane of polarization of the other beam undergoes no appreciable rotation; and
   (c) a polarizer for receiving the two beams which emerge from the plate, the plane of maximum transmittance of the polarizer being parallel to the plane of polarization of the diffracted beam which emerges from the plate.

2. Apparatus comprising in order:
   (a) a hologram which forms a zero order beam and a diffracted beam when illuminated by polarized light;
   (b) a plate comprising a birefringent material for receiving said zero order beam and said diffracted beam, said plate causing the plane of polarization of one of the beams to undergo a rotation of 90° while the plane of polarization of the other beam undergoes no appreciable rotation; and
   (c) a polarizer for receiving the two beams which emerge from the plate, the plane of maximum transmittance of the polarizer being parallel to the plane of polarization of the diffracted beam which emerges from the plate;
   wherein at least two of the hologram, the plate, and the polarizer, are attached together.

3. Apparatus comprising in order:
   (a) a source of polarized white light;
   (b) a hologram illuminated by said polarized white light, said hologram forming a zero order beam and a diffracted beam;
   (c) a plate comprising a birefringent material illuminated by said zero order beam and said diffracted beam, said plate causing the plane of polarization of one of the beams to undergo a rotation of 90° while the plane of polarization of the other beam undergoes no appreciable rotation; and
   (d) a polarizer illuminated by the two beams which emerge from plate, the plane of maximum transmittance of the polarizer being parallel to the plane of polarization of the diffracted beam which emerges from the plate.

4. The apparatus of claim 3 wherein the diffracted beam or the zero order beam is substantially perpendicular to the surface of the hologram.

5. Apparatus comprising in order:
   (a) a hologram which forms a zero order beam and a diffracted beam when illuminated by polarized light;
   (b) a plate comprising a birefringent material for receiving said zero order beam and said diffracted beam, said plate causing the plane of polarization of one of the beams to undergo a rotation of 90° while the plane of polarization of the other beam undergoes no appreciable rotation; and
   (c) a polarizer for receiving the two beams which emerge from the plate, the plane of maximum transmittance of the polarizer being parallel to the plane of polarization of the diffracted beam which emerges from the plate.

6. The apparatus of claim 1, 2, 3, or 5 wherein:
   (i) the plate is made of a uniaxial birefringent material, the axis of said material being perpendicular to the surface of plate;
   (ii) the plate has an ordinary refractive index $n_o$, an extraordinary refractive index $n_e$, and a thickness d;

(iii) the hologram has a diffraction angle θ; and
(iv) the values of $n_o$, $n_e$, d, and θ satisfy the equations:

$$2d\left[n_0 - (n_0^2\cos^2\beta + n_e^2\sin^2\beta)^{1/2}\right] = \lambda\cos\beta$$

7. The apparatus of claim 1, 2, 3, or 5 wherein:
(i) the plate is made of a uniaxial birefringent material, the axis of said material being parallel to the surface of the plate and oriented at an angle of 45° with respect to the plane of polarization of the zero order and diffracted beams incident on the plate;
(ii) the plate has an ordinary refractive index $n_o$, an extraordinary refractive index $n_e$, and a thickness d;
(iii) the hologram has a diffraction angle θ; and
(iv) the values of $n_o$, $n_e$, d, and θ satisfy the equations:

$2(n_o-n_e)d = \lambda \cos\beta/(1-\cos\beta)$ $\beta = \arcsin(\sin\theta/n_0)$.

8. The apparatus of claim 1, 2, 3, or 5 wherein the plate comprises porous glass.

9. The apparatus of claim 1, 3, or 5 wherein at least two of the hologram, the plate, and the polarizer, are attached together.

10. The apparatus of claim 1, 2, or 5 wherein the polarized light is white light.

11. A projector comprising:
(A) a matrix of pixels; and
(B) the apparatus of claim 1, 2, 3, or 5;
wherein the matrix of pixels is illuminated by light emerging from the polarizer.

12. The projector of claim 11 wherein:
(i) the projector further comprises a plurality of micro-lenses, one micro-lens for each pixel;
(ii) each pixel comprises a triplet of cells;
(iii) the hologram diffracts a plurality of triplets of red, green, and blue beams, one triplet of red, green, and blue beams for each pixel; and
(iv) the micro-lenses illuminate the triplets of cells with the triplets of red, green, and blue beams, one beam for each cell.

13. The projector of claim 11 wherein:
(i) each pixel comprises a triplet of cells;
(ii) the hologram both diffracts a plurality of triplets of red, green, and blue beams, one triplet for each pixel, and focuses the red, green, and blue beams on the triplets of cells, one beam for each cell.

* * * * *